United States Patent
Yang et al.

(10) Patent No.: US 12,273,721 B2
(45) Date of Patent: Apr. 8, 2025

(54) METHOD FOR SECURELY CONNECTING VEHICLE AND BLUETOOTH KEY, AND BLUETOOTH MODULE AND BLUETOOTH KEY

(71) Applicant: GUANGZHOU AUTOMOBILE GROUP CO., LTD., Guangdong (CN)

(72) Inventors: Tuchao Yang, Guangdong (CN); Ruifu Lai, Guangdong (CN); Yinggong Mo, Guangdong (CN); Wenqing Chen, Guangdong (CN); Wei Xu, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 316 days.

(21) Appl. No.: 17/924,508

(22) PCT Filed: May 28, 2021

(86) PCT No.: PCT/CN2021/096711
§ 371 (c)(1),
(2) Date: Nov. 10, 2022

(87) PCT Pub. No.: WO2021/258993
PCT Pub. Date: Dec. 30, 2021

(65) Prior Publication Data
US 2023/0180010 A1 Jun. 8, 2023

(30) Foreign Application Priority Data
Jun. 24, 2020 (CN) .......................... 202010584034.5

(51) Int. Cl.
*H04W 12/50* (2021.01)
*B60R 25/24* (2013.01)
(Continued)

(52) U.S. Cl.
CPC ........... *H04W 12/50* (2021.01); *B60R 25/248* (2013.01); *H04W 12/06* (2013.01); *H04W 76/10* (2018.02);
(Continued)

(58) Field of Classification Search
CPC ..... H04W 12/50; H04W 76/10; H04W 12/06; B60R 25/248; B60R 2325/101; B60R 2325/202; B60R 2325/205
See application file for complete search history.

(56) References Cited

FOREIGN PATENT DOCUMENTS

| CN | 102930623 A | 2/2013 |
|---|---|---|
| CN | 104103111 A | 10/2014 |

(Continued)

OTHER PUBLICATIONS

China Patent Office, Office action issued on Apr. 28, 2022.
China Patent Office, Office action issued on Nov. 1, 2022.
China Patent Office, Office action issued on Feb. 4, 2023.

*Primary Examiner* — Frantz B Jean
(74) *Attorney, Agent, or Firm* — Hodgson Russ LLP

(57) ABSTRACT

The present invention relates to a method for securely connecting a vehicle and a Bluetooth key, a vehicle Bluetooth module and a Bluetooth key. The method comprises: when a vehicle Bluetooth module successfully establishes a Bluetooth communication connection with a mobile terminal installed with a Bluetooth key, the vehicle Bluetooth module receiving an authentication request from the Bluetooth key, wherein an authentication manner of the authentication request is simple authentication or common authentication; when the authentication manner of the authentication request is simple authentication, the vehicle Bluetooth module performing security authentication on the Bluetooth key according to the simple authentication manner, and sending an authentication result to the Bluetooth key; and when the authentication result indicates that
(Continued)

authentication fails, or the authentication manner of the authentication request is common authentication, the vehicle Bluetooth module performing security authentication on the Bluetooth key according to the common authentication manner.

9 Claims, 6 Drawing Sheets

(51) Int. Cl.
*H04W 12/06* (2021.01)
*H04W 76/10* (2018.01)

(52) U.S. Cl.
CPC ... *B60R 2325/101* (2013.01); *B60R 2325/202* (2013.01); *B60R 2325/205* (2013.01)

(56) References Cited

FOREIGN PATENT DOCUMENTS

| | | | | |
|---|---|---|---|---|
| CN | 203902481 U | 10/2014 | | |
| CN | 105430603 A | 3/2016 | | |
| CN | 105430605 A | 3/2016 | | |
| CN | 108206996 A | 6/2018 | | |
| CN | 108734826 A | * 11/2018 | ............... | G07C 9/22 |
| CN | 109361718 A | 2/2019 | | |
| CN | 110091828 A | 8/2019 | | |
| CN | 110177354 A | * 8/2019 | ............ | H04W 12/02 |
| CN | 111028397 A | 4/2020 | | |
| CN | 111314897 A | 6/2020 | | |
| KR | 20190128364 A | 11/2019 | | |
| WO | WO 2014098755 A1 | 6/2014 | | |

\* cited by examiner

METHOD FOR SECURELY CONNECTING VEHICLE AND BLUETOOTH KEY, AND BLUETOOTH MODULE AND BLUETOOTH KEY

RELATED APPLICATIONS

This application is a 371 of International Application No. PCT/CN2021/096711, filed May 28, 2021, which is based upon and claims priority to Chinese Patent Application CN202010584034.5, "Method for Securely Connecting Vehicle and Bluetooth Key, and Bluetooth Module and Bluetooth Key", filed Jun. 24, 2020, the entire contents of which are incorporated herein by reference.

TECHNICAL FIELD

The invention relates to the technical field of vehicle communication, in particular to a method for securely connecting vehicle and Bluetooth key, and Bluetooth module and Bluetooth key.

BACKGROUND

At present, the mobile phone Bluetooth key on the market has a non-inductive function, that is, when the mobile phone is close to the vehicle, the mobile phone Bluetooth and the car end are automatically connected. However, due to many connection technologies used, they are connected first and then do the security authentication. The time for each security authentication is too long, resulting in the final recognition of the mobile phone taking too long. When the user arrives at the car with the mobile phone, the mobile phone still cannot connect to the car, and the user experience is not good.

SUMMARY

The present invention aims to provide a method for securely connecting a vehicle with a Bluetooth key, a Bluetooth module for a vehicle, and a Bluetooth key.

In a first aspect, an embodiment of the present invention provides a method for securely connecting a vehicle and a Bluetooth key, comprises:
  when a vehicle Bluetooth module successfully establishes a Bluetooth communication connection with a mobile terminal installed with a Bluetooth key, the vehicle Bluetooth module receives an authentication request from the Bluetooth key, wherein the authentication manner of the authentication request is a simple authentication or an common authentication;
  When the authentication manner of the authentication request is the simple authentication, the vehicle Bluetooth module performs security authentication on the Bluetooth key according to the simple authentication manner, and sends the authentication result to the Bluetooth key;
  When the authentication result is authentication passed, the vehicle Bluetooth module is securely connected with the Bluetooth key;
  when the authentication result indicates that authentication fails, or the authentication manner of the authentication request is common authentication, the vehicle Bluetooth module performs security authentication with the Bluetooth key according to the common authentication manner.

In some embodiments, the vehicle Bluetooth module performs security authentication on the Bluetooth key according to the simple authentication manner, comprises:
  the vehicle Bluetooth module determines whether there is a key whitelist;
  If there is a key whitelist, the vehicle Bluetooth module obtains the device information of the currently connected mobile terminal, and determines whether there is a digital key matching the device information in the key whitelist;
  If there is a digital key matching the device information in the key whitelist, the vehicle Bluetooth module verifies the digital key according to a preset verification rule, and determines whether the security authentication is passed according to the verification result.

In some embodiments, the vehicle Bluetooth module performs security authentication with the Bluetooth key according to the common authentication manner, comprises:
  The vehicle Bluetooth module sends a first feature value and a first random number to the Bluetooth key, and receives a second feature value, a second random number, and key authority data configured to generate the digital key sent by the Bluetooth key;
  The vehicle Bluetooth module receives a first encrypted feature value sent by the Bluetooth key, and performs key authentication on the Bluetooth key according to the first feature value, the key authority data, and the first encrypted feature value;
  After the key authentication is passed, the vehicle Bluetooth module generates a session key according to the first random number and the second random number;
  Wherein, the first encrypted feature value is obtained by encrypting the first feature value by the Bluetooth key according to the digital key downloaded from the server; the second feature value and the digital key are configured for the Bluetooth key to perform key authentication on the vehicle Bluetooth module; When both the vehicle Bluetooth module and the Bluetooth key pass the key authentication of each other and the session key is successfully generated, the vehicle Bluetooth module and the Bluetooth key are securely connected.

In some embodiments, the vehicle Bluetooth module receives a first encrypted feature value sent by the Bluetooth key, and performs key authentication on the Bluetooth key according to the first feature value, the key authority data, and the first encrypted feature value, comprises:
  The vehicle Bluetooth module generates a digital key according to the key authority data, and receives the first encrypted feature value sent by the Bluetooth key;
  The vehicle Bluetooth module decrypts the first encrypted feature value according to the generated digital key to obtain a first verification feature value, and determines whether the key authentication is passed according to the matching result between the first verification feature value and the first feature value;
  The vehicle Bluetooth module encrypts the second feature value according to the generated digital key to obtain a second encrypted feature value, and sends the second encrypted feature value to the Bluetooth key; wherein the second encrypted feature value, the second feature value and the digital key downloaded from the server by the Bluetooth key are configured for the Bluetooth key to perform key authentication on the vehicle Bluetooth module.

In some embodiments, the vehicle Bluetooth module performs security authentication with the Bluetooth key according to the common authentication manner, further comprises:

When the vehicle Bluetooth module and the Bluetooth key are successfully authenticated according to the common authentication manner, If there is no key whitelist, the vehicle Bluetooth module generates a key whitelist, and stores the digital key in the key whitelist;

Or, if there is a key whitelist and there is no digital key matching the device information in the key whitelist, the vehicle Bluetooth module stores the digital key in the key whitelist;

Or, if there is a key whitelist and there is a digital key matching the device information in the key whitelist, the vehicle Bluetooth module replaces the digital key matching the device information in the key whitelist with the generated digital key;

In a second aspect, an embodiment of the present invention provides a method for securely connecting a vehicle and a Bluetooth key, comprises:

When a mobile terminal installed with a Bluetooth key and a vehicle Bluetooth module successfully establish a Bluetooth connection, the Bluetooth key obtains the security information of the mobile terminal, and determines the authentication manner of the security authentication according to the security information; wherein the authentication manner is simple authentication or common authentication;

The Bluetooth key generates an authentication request according to the determined authentication manner, and sends the authentication request to the vehicle Bluetooth module;

When the authentication manner of the authentication request is simple authentication, the Bluetooth key receives the authentication result returned by the vehicle Bluetooth module; the authentication request is configured for the vehicle Bluetooth module to perform security authentication on the Bluetooth key according to the simple method;

When the authentication result is authentication passed, the Bluetooth key is securely connected with the vehicle Bluetooth module;

when the authentication result indicates that authentication fails, or the authentication manner of the authentication request is common authentication, the Bluetooth key performs security authentication with the vehicle Bluetooth module according to the common authentication manner.

In some embodiments, the security information includes device change information of the mobile terminal, user change information, digital key change information and time information when the user logs in the Bluetooth key;

When the device change information of the mobile terminal, user change information, digital key change information and the time information when the user logs in the Bluetooth key meet the preset security conditions, the Bluetooth key determines that the authentication manner of the security authentication is the simple authentication; when the device change information of the mobile terminal, user change information, digital key change information and the time information when the user logs in the Bluetooth key do not meet the preset security conditions, the Bluetooth key determines that the authentication manner of security authentication is the ordinary authentication.

In some embodiments, when the authentication manner of the authentication request is the simple authentication, the authentication request is In particular configured for the vehicle Bluetooth module to obtain the digital key that matches the device information from the key whitelist according to the device information, and verify the digital key for simple authentication of the Bluetooth key.

In some embodiments, the Bluetooth key performs security authentication with the vehicle Bluetooth module according to the common authentication manner, comprises:

The vehicle Bluetooth key sends a key download request to the server, and receives the digital key returned by the server;

The Bluetooth key sends a second characteristic value, a second random number, and key authority data for generating the digital key to the vehicle Bluetooth module, and receives a first characteristic value and a first random number sent by the vehicle Bluetooth module;

The Bluetooth key encrypts the first feature value according to the downloaded digital key to obtain the first encrypted feature value, and sends the first encrypted feature value to the vehicle Bluetooth module;

The Bluetooth key receives the second encrypted feature value sent by the vehicle Bluetooth module, and decrypts the second feature value according to the digital key to obtain the second verification feature value;

The Bluetooth key determines whether the key authentication of the vehicle Bluetooth module is passed according to the matching result between the second verification feature value and the second feature value;

The Bluetooth key generates a session key according to the first random number and the second random number;

Wherein, the first feature value, the key authority data, and the first encryption feature value are configured for the vehicle Bluetooth module to perform key authentication on the Bluetooth key according to the common authentication manner; the second encryption feature value is configured for the vehicle Bluetooth module to generates a digital key according to the key authority data, and encrypts the second feature value according to the generated digital key; when the Bluetooth key and the vehicle Bluetooth module pass the key authentication of each other according to the common authentication manner and the session key is successfully generated, the Bluetooth key is securely connected with the vehicle Bluetooth module.

In a third aspect, an embodiment of the present invention provides a computer-readable storage medium having stored therein instructions that, when executed by a processor of a device, causes the device to perform a method for generating driving suggestions, the method comprises: when a vehicle Bluetooth module successfully establishes a Bluetooth communication connection with a mobile terminal installed with a Bluetooth key, the vehicle Bluetooth module receives an authentication request from the Bluetooth key, wherein the authentication manner of the authentication request is a simple authentication or an common authentication; When the authentication manner of the authentication request is the simple authentication, the vehicle Bluetooth module performs security authentication on the Bluetooth key according to the simple authentication manner, and sends the authentication result to the Bluetooth key; When the authentication result is authentication passed, the vehicle Bluetooth module is securely connected with the Bluetooth key; When the authentication result indicates that authentication fails, or the authentication manner of the authentication request is common authentication, the vehicle Bluetooth module performs security authentication with the Bluetooth key according to the common authentication manner.

Other features and advantages of the present invention will be described in the following description and will be apparent partly from the description, or will be understood by implementing the embodiments of the present invention. The objectives and other advantages of the invention may be realized and attained by the structure particularly pointed out in the description, claims and drawings.

BRIEF DESCRIPTION OF THE DRAWINGS

In order to explain the technical solutions of the embodiments of the present invention or the prior art more clearly, the following will briefly introduce the drawings that need to be used in the description of the embodiments or the prior art. Obviously, the drawings in the following description are only some embodiments of the present invention. For those of ordinary skill in the art, without any creative work, other drawings can be obtained according to these drawings.

DETAILED DESCRIPTION

Figure 1:
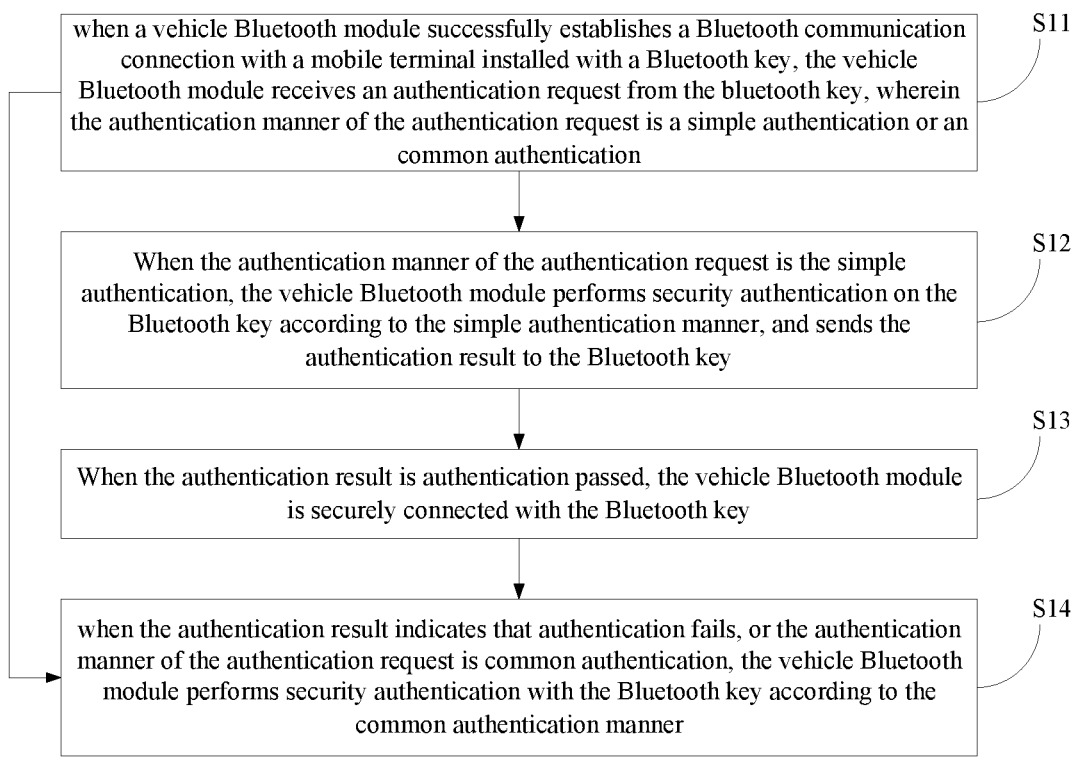
FIG. 1 is a schematic flowchart of a method for securely connecting a vehicle and a Bluetooth key according to the first embodiment of the present invention.

Various exemplary embodiments, features and aspects of the present disclosure will be described in detail below with reference to the accompanying drawings. The same reference numbers in the figures denote elements that have the same or similar functions. Although various aspects of the embodiments are shown in the drawings, the drawings are not necessarily drawn to scale unless otherwise indicated.

In addition, in order to better illustrate the present invention, numerous specific details are given in the following specific embodiments. It will be understood by those skilled in the art that the present invention may be practiced without certain specific details. In some instances, means well known to those skilled in the art have not been described in detail in order not to obscure the subject matter of the present invention.

Refer to FIG. 1, an embodiment of the present invention provides a method for securely connecting a vehicle and a Bluetooth key, including the following steps S11~S14:

Step S11, when a vehicle Bluetooth module successfully establishes a Bluetooth communication connection with a mobile terminal installed with a Bluetooth key, the vehicle Bluetooth module receives an authentication request from the Bluetooth key, wherein the authentication manner of the authentication request is a simple authentication or an common authentication;

In particular, the Bluetooth key is generally an APP, that is, an application program. The method in this embodiment is suitable for the scenario where the mobile terminal and the vehicle Bluetooth module have successfully established a Bluetooth communication connection at least once. If the mobile terminal and the vehicle Bluetooth module are connected for the first time, then it is necessary to manually operate the Bluetooth key of the mobile terminal to complete the Bluetooth connection and pairing operation between the mobile terminal and the vehicle Bluetooth module. When the connection and pairing is successful, the mobile terminal and the vehicle Bluetooth module will record their pairing status respectively. The next time the mobile terminal and the vehicle Bluetooth module are close to each other to a certain range and the both Bluetooth switches are turned on, the Bluetooth connection operation will be completed automatically.

Wherein, the mobile terminal includes, but is not limited to, a mobile smart terminal such as a mobile phone, a tablet computer, and a smart bracelet.

This embodiment proposes a security authentication manner combining simple authentication and common authentication, and the simple authentication manner is used first for security authentication. The Simple authentication means that the vehicle Bluetooth module performs one-way authentication on the Bluetooth key of the mobile terminal according to the preset authentication rules, and when the information security situation in the mobile terminal does not meet the requirements of simple authentication, or when the simple authentication manner for security authentication fails, the common authentication manner is used to conduct the two-way authentication between the vehicle Bluetooth module and the Bluetooth key of the mobile terminal.

It can be understood that the specific authentication rules of the simple authentication manner and the common authentication manner in this embodiment can be specifically configured. As long as the characteristics that the common authentication manner is more complicated but also safer than the simple authentication manner are satisfied, the purpose and effect of this embodiment can be achieved.

Step S12, when the authentication manner of the authentication request is the simple authentication, the vehicle Bluetooth module performs security authentication on the Bluetooth key according to the simple authentication manner, and sends the authentication result to the Bluetooth key;

In particular, the authentication result is authentication passed or authentication failed.

Step S13, when the authentication result is authentication passed, the vehicle Bluetooth module is securely connected with the Bluetooth key;

Step S14, when the authentication result indicates that authentication fails, or the authentication manner of the authentication request is common authentication, the vehicle Bluetooth module performs security authentication with the Bluetooth key according to the common authentication manner.

In particular, the selection of the authentication manner in this embodiment needs to be confirmed by both the vehicle Bluetooth module and the Bluetooth key. When either party determines to adopt the common authentication manner for safety authentication, the current authentication manner is determined to be the common authentication manner. Only when both parties decide to use the simple authentication manner for security authentication, the current authentication manner is determined as the simple authentication manner. It can be understood that the process of determining the security authentication manner is the authentication manner negotiation process.

Figure 2:
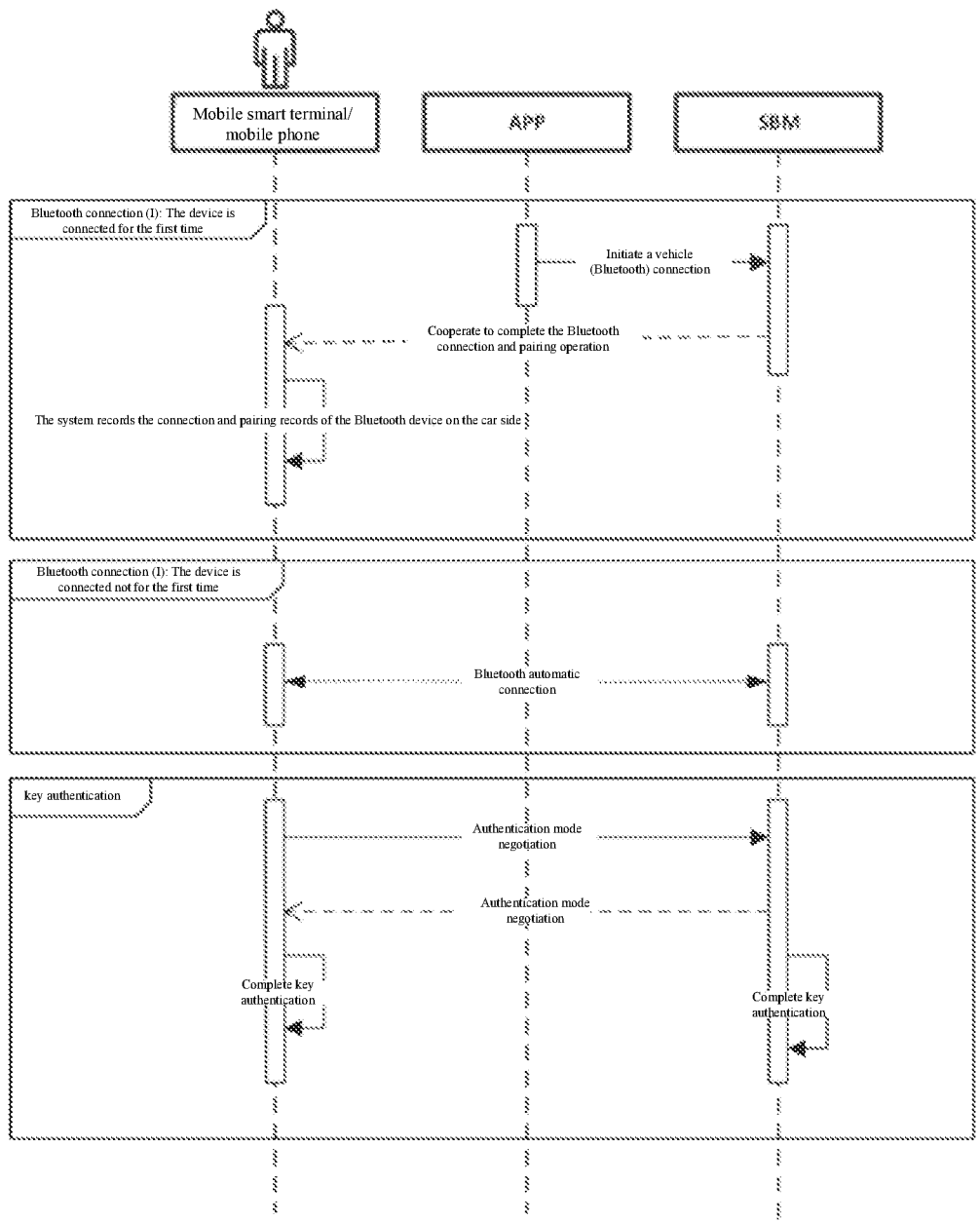
FIG. 2 is a schematic flowchart of the initial Bluetooth connection between the vehicle Bluetooth module and the Bluetooth key of the mobile terminal.

Among them, the flow of the initial Bluetooth connection between the vehicle Bluetooth module and the Bluetooth key of the mobile terminal, can be seen in FIG. 2.

In summary, the method of this embodiment adopts a security authentication manner combining simple authentication and common authentication, and adopts different security authentication manners according to different security states, which can ensure the safety while also ensuring the stability of the connection and improve the connection speed between the vehicle and the Bluetooth key.

In a specific embodiment, in the Step S12, the vehicle Bluetooth module performs security authentication on the Bluetooth key according to the simple authentication manner, including the following steps:

Step S121, the vehicle Bluetooth module determines whether there is a key whitelist;

In particular, the key whitelist refers to the list in which one or more digital keys are stored. Each digital key in the key whitelist is associated with and matched with the device information of a mobile terminal. In particular, the device information can be the MAC address of the mobile terminal and other information that can identify the mobile terminal. It can be understood that when the vehicle terminal does not have any matching digital keys, there is no key whitelist.

Step S122, if there is a key whitelist, the vehicle Bluetooth module obtains the device information of the currently connected mobile terminal, and determines whether there is a digital key matching the device information in the key whitelist;

In particular, when it is determined that there is a key whitelist at the vehicle side, it is further necessary to determine whether there is a digital key matching the device information in the key whitelist. It can be understood that the digital key that can be matched here can be considered to have been used at least once, the security is high, but the verification of the digital key is also required.

Step S123, if there is a digital key matching the device information in the key whitelist, the vehicle Bluetooth module verifies the digital key according to a preset verification rule, and determines whether the security authentication is passed according to the verification result.

In particular, in the step, the digital key obtained by the search is verified according to the preset verification rules, and the verification content includes but is not limited to the valid time and authority of the digital key. It can be understood that the verification of the digital key is to verify the correctness of the key data, and the verification method can be specifically limited according to the actual security requirements.

Figure 3:
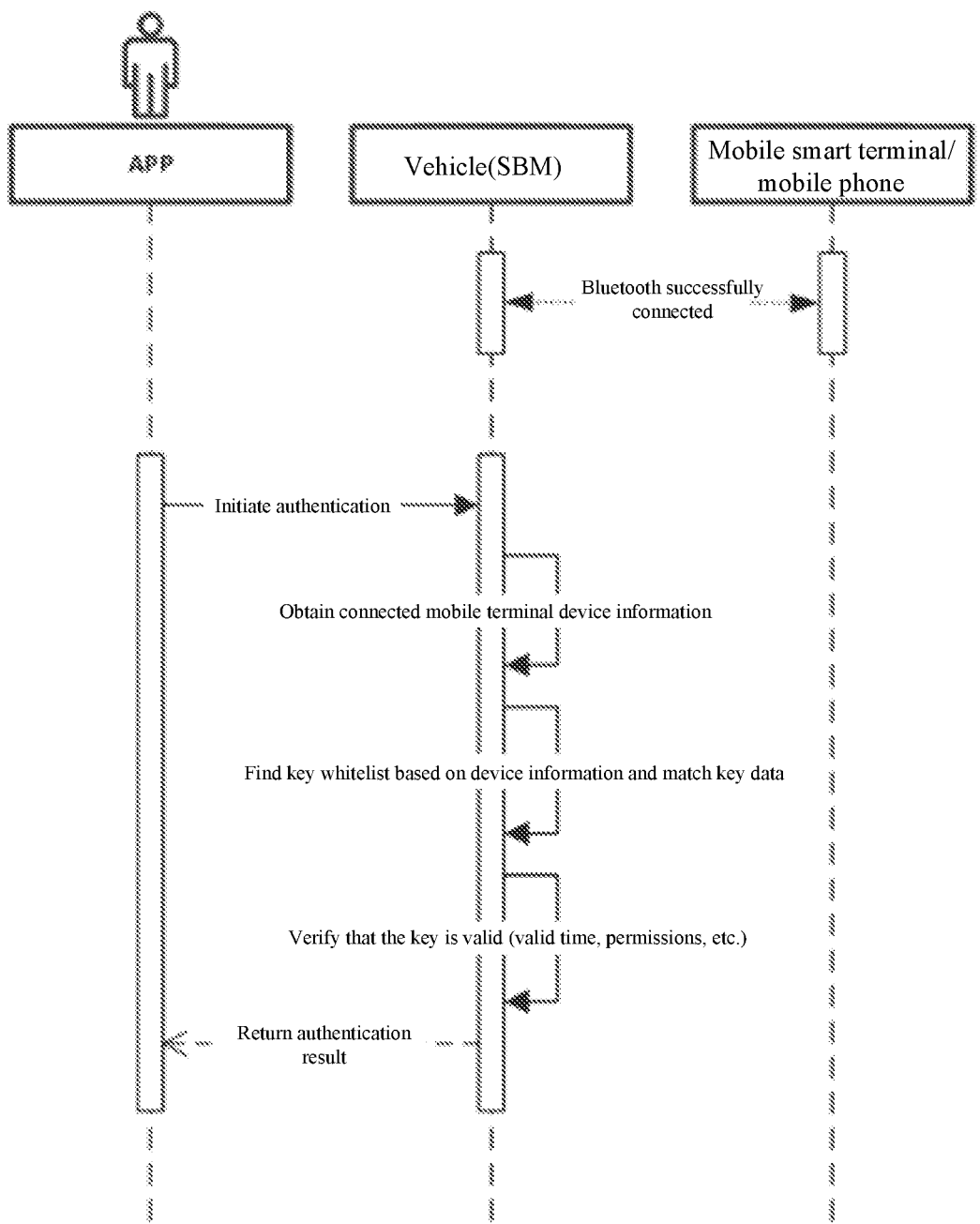
FIG. 3 is a specific schematic flowchart of security authentication performed by a Bluetooth key and a vehicle Bluetooth module according to a simple authentication manner.

In particular, the specific process for the authentication of the vehicle Bluetooth module according to the simple method can be referred to FIG. 3.

In a specific embodiment, in the step S14, the vehicle Bluetooth module performs security authentication with the Bluetooth key according to a common authentication manner, including the following steps:

Step S141, the vehicle Bluetooth module sends a first feature value and a first random number to the Bluetooth key, and receives a second feature value, a second random number, and key authority data configured to generate the digital key sent by the Bluetooth key;

In particular, when the vehicle Bluetooth module negotiates with the Bluetooth key and determines to use the common method for security authentication, it means that there is no digital key in the vehicle Bluetooth module or there is a security problem with the digital key, and it is necessary to re-update the digital key and perform security authentication. The Bluetooth key therefore initiates a digital key download request to the server that provides the digital key. After receiving the digital key download request, the server verifies the download authority of the Bluetooth key according to the digital key download request. After the verification is passed, it returns the digital key to the Bluetooth key, at this time, the Bluetooth key completes the download of the digital key. It can be understood that there are many ways for the server to verify the download authority, for example, determining whether the user change information of the Bluetooth key is a registered account, which is not specifically limited in this embodiment.

Among them, the Bluetooth key, after downloading the digital key, processes the digital key to obtain key authority data that can be used to generate the digital key. Of course, the key authority data for generating the digital key can also be directly provided by the server. The vehicle Bluetooth module on the vehicle side that the key authority data is used for can generate the same digital key as the digital key downloaded by the Bluetooth key according to the key authority data.

In particular, the vehicle side also stores a corresponding algorithm that can be used to generate the digital key according to the key authority data. The specific content of the algorithm is not limited to a certain one, as long as the vehicle Bluetooth module can generate the same digital key as the digital key downloaded by the Bluetooth key according to the key authority data provided by the Bluetooth key.

In the step, the vehicle Bluetooth module generates a first feature value and a first random number, and sends them to the Bluetooth key, and the Bluetooth key generates a second feature value and a second random number, and sends the second feature value, the second random number and the key authority data configured to generate the digital key sent by the Bluetooth key to the vehicle Bluetooth module, at this time, the exchange of identity feature values between the two parties is completed.

Step S142, the vehicle Bluetooth module receives a first encrypted feature value sent by the Bluetooth key, and performs key authentication on the Bluetooth key according to the first feature value, the key authority data, and the first encrypted feature value; wherein, the first encrypted feature value is obtained by encrypting the first feature value by the Bluetooth key according to the digital key downloaded from the server; the second feature value and the digital key downloaded by the Bluetooth key from the server are configured for the Bluetooth key to perform key authentication on the vehicle Bluetooth module;

In particular, the digital key downloaded by the Bluetooth key from the server in the step is a key, and the Bluetooth key can encrypt the first feature value according to the preset encryption algorithm and the key to obtain the first encrypted feature value.

Step S143, after the key authentication is passed, the vehicle Bluetooth module generates a session key according to the first random number and the second random number;

Wherein, when both the vehicle Bluetooth module and the Bluetooth key pass the key authentication of each other and the session key is successfully generated, the vehicle Bluetooth module and the Bluetooth key are securely connected.

In particular, when the vehicle Bluetooth module passes the key authentication of the Bluetooth key, the vehicle Bluetooth module further conducts session key negotiation with the Bluetooth key. In particular, a session is generated according to the first random number and the second random number exchanged by the two parties. The generated session key is a dynamic key, which is only used for the session between the two parties during the current connection.

Among them, one end of the Bluetooth key performs key authentication on the vehicle Bluetooth module according to the second feature value and the downloaded digital key. Similarly, when the key authentication of the Bluetooth key to the vehicle Bluetooth module is passed, the session key negotiation is further performed with the vehicle Bluetooth module. The same session key is generated according to the first random number and the second random number exchanged by both parties.

In a specific embodiment, the step S142 specifically includes:

Step S1421, the vehicle Bluetooth module generates a digital key according to the key authority data, and receives the first encrypted feature value sent by the Bluetooth key;

In detail, the vehicle Bluetooth module generates a digital key according to the key authority data and the preset algorithm, and the digital key generated by the vehicle Bluetooth module should be consistent with the digital key downloaded from the server by the Bluetooth key.

Step S1422, the vehicle Bluetooth module decrypts the first encrypted feature value according to the generated digital key to obtain a first verification feature value, and determines whether the key authentication is passed according to the matching result between the first verification feature value and the first feature value;

In particular, the vehicle Bluetooth module decrypts the first encrypted feature value according to the generated digital key and the preset decryption algorithm to obtain the first verification feature value, and finally determine whether the key authentication of the Bluetooth key is passed according to the matching result of the first verification feature value and the first feature value. In detail, when the first verification feature value is consistent with the first feature value, the key authentication of the Bluetooth key by the vehicle Bluetooth module is passed, and when the first verification feature value is inconsistent with the first feature value, the key authentication of the Bluetooth key by the vehicle Bluetooth module fails.

Step S1423, the vehicle Bluetooth module encrypts the second feature value according to the generated digital key to obtain a second encrypted feature value, and sends the second encrypted feature value to the Bluetooth key; wherein the second encrypted feature value, the second feature value and the digital key downloaded from the server by the Bluetooth key are configured for the Bluetooth key to perform key authentication on the vehicle Bluetooth module.

In particular, the vehicle Bluetooth module encrypts the second feature value according to the generated digital key and the preset encryption algorithm to obtain the second encryption feature value. After receiving the second encryption feature value, the Bluetooth key decrypts the second encryption feature value according to the digital key (key) downloaded from the server and the preset decryption algorithm to obtain the second verification feature value, and compares the second verification feature value with the second feature value previously received from the vehicle Bluetooth module. When the second verification feature value is consistent with the second feature value, the key authentication of the Bluetooth key to the vehicle Bluetooth module is passed, and when the second verification feature value is inconsistent with the second feature value, the key authentication of the Bluetooth key to the vehicle Bluetooth module fails.

It should be noted that the preset encryption algorithm and preset decryption algorithm used by the vehicle Bluetooth module and the Bluetooth key are the same, so that the data obtained by the encryption and decryption of the two are consistent. The specific contents of the preset encryption algorithm and the preset decryption algorithm are not limited.

Figure 4:
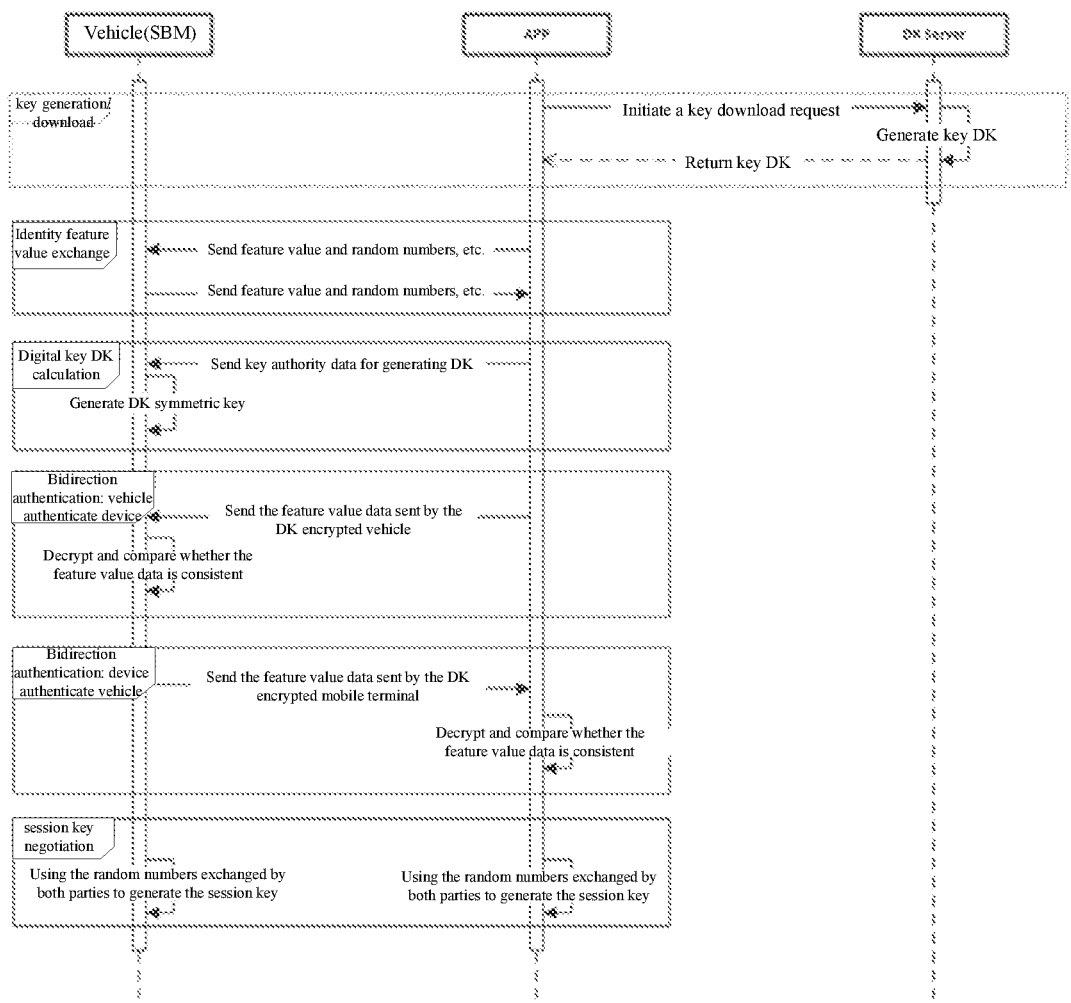
FIG. 4 is a specific schematic flowchart of security authentication performed by a Bluetooth key and a vehicle Bluetooth module according to a common authentication manner.

In particular, the specific process of the vehicle Bluetooth module performing security authentication on the Bluetooth key according to the common authentication manner can be referred to FIG. 4.

In a specific embodiment, the vehicle Bluetooth module performs security authentication with the Bluetooth key according to a common authentication manner, iand also updates the digital key, which specifically includes:

When the vehicle Bluetooth module and the Bluetooth key are successfully authenticated according to the common authentication manner, the digital key at this time should be based on the latest digital key downloaded from the server by the Bluetooth key.

If there is no key whitelist, the vehicle Bluetooth module generates a key whitelist, and stores the digital key in the key whitelist, and establishes a matching relationship between the digital key and the device information of the currently connected mobile terminal.

Or, if there is a key whitelist and there is no digital key matching the device information in the key whitelist, the vehicle Bluetooth module stores the digital key in the key whitelist, and establishes a matching relationship between the digital key and the device information of the currently connected mobile terminal.

Or, if there is a key whitelist and there is a digital key matching the device information in the key whitelist, the vehicle Bluetooth module replaces the digital key matching the device information in the key whitelist with the generated digital key, and establishes a matching relationship between the digital key and the device information of the currently connected mobile terminal.

In particular, in this embodiment, different methods for updating the digital key are adopted according to different failure reasons in the process of safety authentication of the vehicle Bluetooth module by the vehicle Bluetooth module according to the simple authentication manner.

By applying the method of the first embodiment, the connection between the vehicle Bluetooth module and the Bluetooth key can be stable and not restricted by the mobile terminal, the security authentication time is fast and sufficient security is ensured, the connection is fast, and the connection can be achieved in seconds.

Embodiment 2

Figure 5:
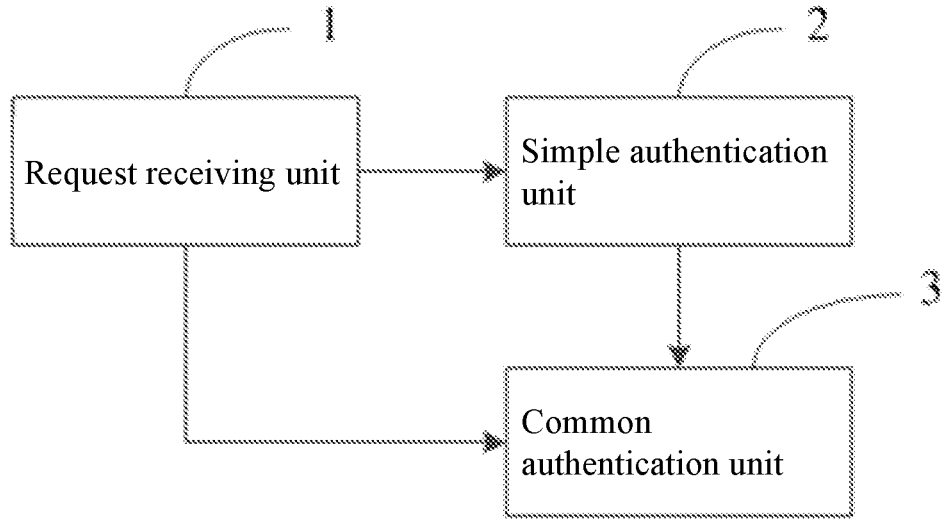
FIG. 5 is a schematic diagram of a system framework of a vehicle Bluetooth module according to the second embodiment of the present invention.

Referring to FIG. 5, an embodiment of the present invention provides a vehicle Bluetooth module, which is configured to perform the steps of the method described in the embodiment 1 above, including:

- A request receiving unit 11, configured for the vehicle Bluetooth module to receive an authentication request from the Bluetooth key when a vehicle Bluetooth module successfully establishes a Bluetooth communication connection with a mobile terminal installed with a Bluetooth key, wherein the authentication manner of the authentication request is a simple authentication or an common authentication;
- A simple authentication unit 12, configured for the vehicle Bluetooth module to perform security authentication on the Bluetooth key according to the simple authentication manner, and send the authentication result to the Bluetooth key when the authentication manner of the authentication request is the simple authentication; Wherein, when the authentication result is authentication passed, the vehicle Bluetooth module is securely connected with the Bluetooth key;
- A common authentication unit 13, configured to for the vehicle Bluetooth module to perform security authentication with the Bluetooth key according to the common authentication manner when the authentication result indicates that authentication fails, or the authentication manner of the authentication request is common authentication.

The system embodiments described above are only illustrative, wherein the units described as separate components may or may not be physically separated, and the components shown as units may or may not be physical units, that is, they may be located in one place, or it can be distributed over multiple network elements. Some or all of the modules may be selected according to actual needs to achieve the purpose of the solution in this embodiment.

It should be noted that the system described in the second embodiment above corresponds to the method described in the first embodiment above. Therefore, the undescribed part of the system described in the second embodiment above can be obtained by referring to the content of the method described in the first embodiment above, which will not be repeated here.

Moreover, if the system of the second embodiment is implemented in the form of software functional units and sold or used as an independent product, it can be stored in a computer-readable storage medium.

In particular, the computer-readable storage medium may include: any entity or device capable of carrying the computer program code, a recording medium, a USB flash drive, a removable hard disk, a magnetic disk, an optical disk, a computer memory, a read-only memory (ROM, Read-Only Memory), random access memory (RAM, Random Access Memory), electric carrier signal, telecommunication signal and software distribution medium, etc.

Embodiment 3

Figure 6:
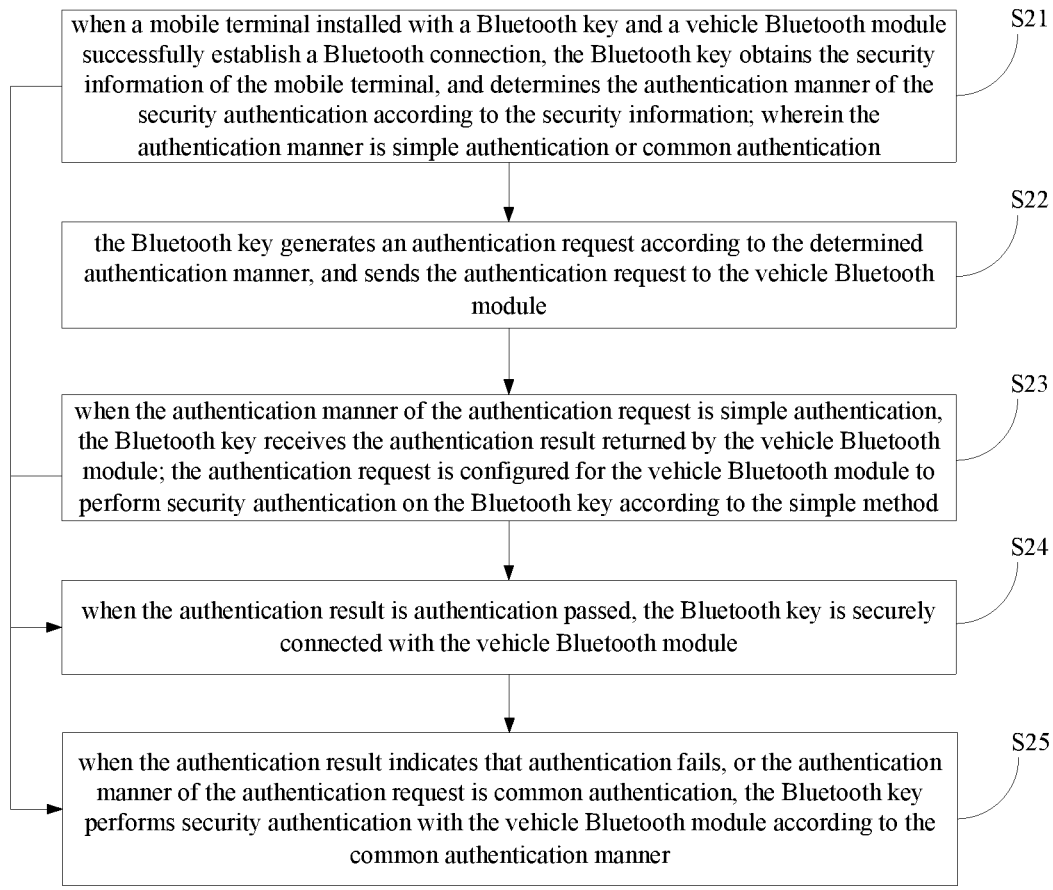
FIG. 6 is a schematic flowchart of a method for securely connecting a vehicle and a Bluetooth key according to the third embodiment of the present invention.

Refer to FIG. 6, the third embodiment of the present invention provides a method for securely connecting a vehicle and a Bluetooth key, including the following steps S21~S25:

Step S21, when a mobile terminal installed with a Bluetooth key and a vehicle Bluetooth module successfully establish a Bluetooth connection, the Bluetooth key obtains the security information of the mobile terminal, and determines the authentication manner of the security authentication according to the security information; wherein the authentication manner is simple authentication or common authentication;

In particular, the Bluetooth key is generally an APP. The method in this embodiment is suitable for the scenario where the mobile terminal and the vehicle Bluetooth module have successfully established a Bluetooth communication connection at least once. If the mobile terminal and the vehicle Bluetooth module are connected for the first time, then It is necessary to manually operate the Bluetooth key of the mobile terminal to complete the Bluetooth connection and pairing operation between the mobile terminal and the vehicle Bluetooth module. When the connection and pairing is successful, the mobile terminal and the vehicle Bluetooth module will record their pairing status respectively. The next time the mobile terminal and the vehicle Bluetooth module are close to each other to a certain range and the both Bluetooth switches are turned on, the Bluetooth connection operation will be completed automatically.

Wherein, the mobile terminal includes, but is not limited to, a mobile smart terminal such as a mobile phone, a tablet computer, and a smart bracelet.

This embodiment proposes a security authentication manner combining simple authentication and common authentication, and the simple authentication manner is used first for security authentication. The Simple authentication means that the vehicle Bluetooth module performs one-way authentication on the Bluetooth key of the mobile terminal according to the preset authentication rules, and when the information security situation in the mobile terminal does not meet the requirements of simple authentication, or when the simple authentication manner for security authentication fails, the common authentication manner is used to conduct the two-way authentication between the vehicle Bluetooth module and the Bluetooth key of the mobile terminal.

It can be understood that the specific authentication rules of the simple authentication manner and the common authentication manner in this embodiment can be specifically configured. As long as the characteristics that the common authentication manner is more complicated but also safer than the simple authentication manner are satisfied, the purpose and effect of this embodiment can be achieved.

Step S22, the Bluetooth key generates an authentication request according to the determined authentication manner, and sends the authentication request to the vehicle Bluetooth module;

Step S23, when the authentication manner of the authentication request is simple authentication, the Bluetooth key receives the authentication result returned by the vehicle Bluetooth module; the authentication request is configured for the vehicle Bluetooth module to perform security authentication on the Bluetooth key according to the simple method;

In particular, the authentication result is authentication passed or authentication failed.

Step S24, when the authentication result is authentication passed, the Bluetooth key is securely connected with the vehicle Bluetooth module;

Step S25, when the authentication result indicates that authentication fails, or the authentication manner of the authentication request is common authentication, the Bluetooth key performs security authentication with the vehicle Bluetooth module according to the common authentication manner.

In particular, the selection of the authentication manner in this embodiment needs to be confirmed by both the vehicle Bluetooth module and the Bluetooth key. When either party determines to adopt the common authentication manner for safety authentication, the current authentication manner is determined to be the common authentication manner. Only when both parties decide to use the simple authentication manner for security authentication, the current authentication manner is determined as the simple authentication manner. It can be understood that the process of determining the security authentication manner is the authentication manner negotiation process.

Among them, the flow of the initial Bluetooth connection between the vehicle Bluetooth module and the Bluetooth key of the mobile terminal, can be seen in FIG. 2.

In summary, the method of this embodiment adopts a security authentication manner combining simple authentication and common authentication, and adopts different security authentication manners according to different security states, which can ensure the safety while also ensuring the stability of the connection and improve the connection speed between the vehicle and the Bluetooth key.

In a specific embodiment, the security information includes device change information of the mobile terminal, user change information, digital key change information and time information when the user logs in the Bluetooth key;

When the device change information of the mobile terminal, user change information, digital key change information and the time information when the user logs in the Bluetooth key meet the preset security conditions, the Bluetooth key determines that the authentication manner of the security authentication is the simple authentication; when the device change information of the mobile terminal, user change information, digital key change information and the time information when the user logs in the Bluetooth key do not meet the preset security conditions, the Bluetooth key determines that the authentication manner of security authentication is the ordinary authentication.

In particular, when any one of the mobile terminal device information, user information, key data, etc. is changed, the preset security conditions are not met. In addition, when the user has not logged in to the Bluetooth key App for a long time, the preset security conditions are also not met. Otherwise, the preset safety conditions are met. As can be appreciated, the time of logging into the Bluetooth key App can be set by user themselves.

Of course, in addition to the security information listed above, other security factors of the mobile terminal may be included.

In a specific embodiment, when the authentication manner of the authentication request is the simple authentication, the authentication request is In particular configured for the vehicle Bluetooth module to obtain the digital key that matches the device information from the key whitelist according to the device information, and verify the digital key for simple authentication of the Bluetooth key.

In particular, the vehicle Bluetooth module performs security authentication on the Bluetooth key according to the simple authentication manner, including the following steps:

the vehicle Bluetooth module determines whether there is a key whitelist;

In particular, the key whitelist refers to the list in which one or more digital keys are stored. Each digital key in the key whitelist is associated with and matched with the device information of a mobile terminal. In particular, the device information can be the MAC address of the mobile terminal and other information that can identify the mobile terminal. It can be understood that when the vehicle terminal does not have any matching digital keys, there is no key whitelist.

If there is a key whitelist, the vehicle Bluetooth module obtains the device information of the currently connected mobile terminal, and determines whether there is a digital key matching the device information in the key whitelist;

In particular, when it is determined that there is a key whitelist at the vehicle side, it is further necessary to determine whether there is a digital key matching the device information in the key whitelist. It can be understood that the digital key that can be matched here can be considered to have been used at least once, the security is high, but the verification of the digital key is also required.

If there is a digital key matching the device information in the key whitelist, the vehicle Bluetooth module verifies the digital key according to a preset verification rule, and determines whether the security authentication is passed according to the verification result.

In particular, in the step, the digital key obtained by the search is verified according to the preset verification rules, and the verification content includes but is not limited to the valid time and authority of the digital key. It can be understood that the verification of the digital key is to verify the correctness of the key data, and the verification method can be specifically limited according to the actual security requirements.

In particular, the specific process for the authentication of the vehicle Bluetooth module according to the simple method can be referred to FIG. 3.

In a specific embodiment, the Bluetooth key performs security authentication with the vehicle Bluetooth module according to the common authentication manner, including:

Step S251, the vehicle Bluetooth key sends a key download request to the server, and receives the digital key returned by the server;

In particular, when the vehicle Bluetooth module negotiates with the Bluetooth key and determines to use the common method for security authentication, it means that there is no digital key in the vehicle Bluetooth module or there is a security problem with the digital key, and it is necessary to re-update the digital key and perform security authentication. The Bluetooth key therefore initiates a digital key download request to the server that provides the digital key. After receiving the digital key download request, the server verifies the download authority of the Bluetooth key according to the digital key download request. After the verification is passed, it returns the digital key to the Bluetooth key, at this time, the Bluetooth key completes the download of the digital key. It can be understood that there are many ways for the server to verify the download authority, for example, determining whether the user information of the Bluetooth key is a registered account, which is not specifically limited in this embodiment.

Among them, the Bluetooth key, after downloading the digital key, processes the digital key to obtain key authority data that can be used to generate the digital key. Of course, the key authority data for generating the digital key can also be directly provided by the server. The vehicle Bluetooth module on the vehicle side that the key authority data is used for can generate the same digital key as the digital key downloaded by the Bluetooth key according to the key authority data.

In particular, the vehicle side also stores a corresponding algorithm that can be used to generate the digital key according to the key authority data. The specific content of the algorithm is not limited to a certain one, as long as the vehicle Bluetooth module can generate the same digital key as the digital key downloaded by the Bluetooth key according to the key authority data provided by the Bluetooth key.

Step S252, the Bluetooth key sends a second characteristic value, a second random number, and key authority data for generating the digital key to the vehicle Bluetooth module, and receives a first characteristic value and a first random number sent by the vehicle Bluetooth module;

In particular, in the step, the Bluetooth key generates a second feature value and a second random number, and sends the second feature value, the second random number and the key authority data configured to generate the digital key sent by the Bluetooth key to the vehicle Bluetooth module, the vehicle Bluetooth module generates a first feature value and a first random number, and sends them to the Bluetooth key, at this time, the exchange of identity feature values between the two parties is completed.

Step S253, the Bluetooth key encrypts the first feature value according to the downloaded digital key to obtain the first encrypted feature value, and sends the first encrypted feature value to the vehicle Bluetooth module;

In particular, the digital key downloaded by the Bluetooth key from the server in the step is a key, and the Bluetooth key can encrypt the first feature value according to the preset encryption algorithm and the key to obtain the first encrypted feature value.

Step S254, the Bluetooth key receives the second encrypted feature value sent by the vehicle Bluetooth module, and decrypts the second feature value according to the digital key to obtain the second verification feature value;

In detail, the vehicle Bluetooth module generates a digital key according to the key authority data and the preset algorithm, and the digital key generated by the vehicle Bluetooth module should be consistent with the digital key downloaded from the server by the Bluetooth key. The vehicle Bluetooth module encrypts the second feature value according to the generated digital key and the preset encryption algorithm to obtain the second encryption feature value. After receiving the second encryption feature value, the Bluetooth key decrypts the second encryption feature value according to the digital key (key) downloaded from the server and the preset decryption algorithm to obtain the second verification feature value.

Step S255, the Bluetooth key determines whether the key authentication of the vehicle Bluetooth module is passed according to the matching result between the second verification feature value and the second feature value;

In particular, the Bluetooth key compares the second verification feature value with the second feature value previously received from the vehicle Bluetooth module. When the second verification feature value is consistent with the second feature value, the key authentication of the Bluetooth key to the vehicle Bluetooth module is passed, and when the second verification feature value is inconsistent with the second feature value, the key authentication of the Bluetooth key to the vehicle Bluetooth module fails.

Step S256, the Bluetooth key generates a session key according to the first random number and the second random number;

Wherein, the first feature value, the key authority data, and the first encrypted feature value are configured for the vehicle Bluetooth module to perform key authentication on the Bluetooth key according to a common authentication manner; In particular, the vehicle Bluetooth module decrypts the first encrypted feature value according to the generated digital key and the preset decryption algorithm to obtain the first verification feature value, and finally determine whether the key authentication of the Bluetooth key is passed according to the matching result of the first verification feature value and the first feature value. In detail, when the first verification feature value is consistent with the first feature value, the key authentication of the Bluetooth key by the vehicle Bluetooth module is passed, and when the first verification feature value is inconsistent with the first feature value, the key authentication of the Bluetooth key by the vehicle Bluetooth module fails.

It should be noted that the preset encryption algorithm and preset decryption algorithm used by the vehicle Bluetooth module and the Bluetooth key are the same, so that the data obtained by the encryption and decryption of the two are consistent. The specific contents of the preset encryption algorithm and the preset decryption algorithm are not limited.

Wherein, when both the Bluetooth key and the vehicle Bluetooth module pass the key authentication of each other according to the common authentication manner and the session key is successfully generated, the Bluetooth key and the vehicle Bluetooth module and the vehicle Bluetooth module are securely connected.

Wherein, the specific process of the Bluetooth key performing security authentication with the vehicle Bluetooth module according to the common authentication manner can be referred to FIG. 4.

In particular, the method described in third embodiment above corresponds to the method described in first embodiment above. The method described in third embodiment above is an authentication process described with a Bluetooth key as the subject, and the method described in first embodiment above is an authentication process described with the vehicle Bluetooth module as the subject. Therefore, the related descriptions of the method described in the third embodiment and the method described in the first embodiment can be referred to each other to better explain the concept of the present application.

Embodiment 4

Figure 7:
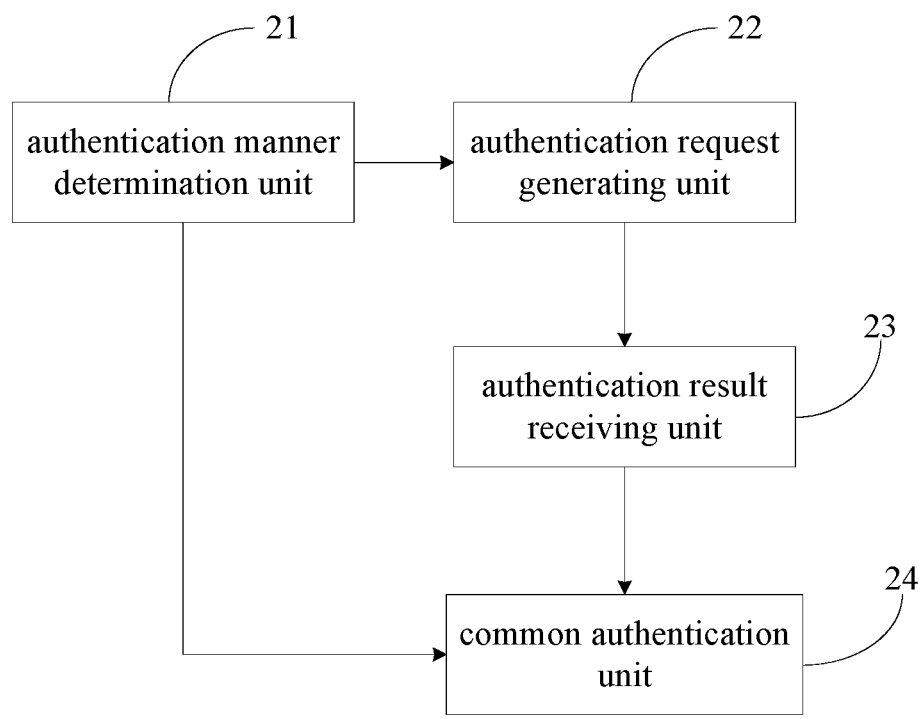
FIG. 7 is a schematic diagram of a system framework of a Bluetooth key according to the embodiment four of the present invention.

Referring to FIG. 7, the fourth embodiment of the present invention provides a Bluetooth key, which is configured to perform the steps of the method described in the third embodiment above, including:

An authentication manner determination unit 21, configured to obtain the security information of the mobile terminal, and determine the authentication manner of the security authentication according to the security information when a mobile terminal installed with a Bluetooth key and a vehicle Bluetooth module successfully establish a Bluetooth connection; wherein the authentication manner is simple authentication or common authentication;

An authentication request generating unit 22, configured for the Bluetooth key to generate an authentication request according to the determined authentication manner, and send the authentication request to the vehicle Bluetooth module;

An authentication result receiving unit 23, configured for the Bluetooth key to receive the authentication result returned by the vehicle Bluetooth module when the authentication manner of the authentication request is simple authentication; Wherein, the authentication request is configured for the vehicle Bluetooth module to perform security authentication on the Bluetooth key according to the simple method; when the authentication result is that the authentication is passed, the Bluetooth key is securely connected with the vehicle Bluetooth module;

A common authentication unit 24, configured for the Bluetooth key to perform security authentication with the vehicle Bluetooth module according to the common authentication manner when the authentication result indicates that authentication fails, or the authentication manner of the authentication request is common authentication.

The system embodiments described above are only illustrative, wherein the units described as separate components may or may not be physically separated, and the components shown as units may or may not be physical units, that is, they may be located in one place, or it can be distributed over multiple network elements. Some or all of the modules may be selected according to actual needs to achieve the purpose of the solution in this embodiment.

It should be noted that the system described in the fourth embodiment above corresponds to the method described in the third embodiment above. Therefore, the undescribed part of the system described in the fourth embodiment above can be obtained by referring to the content of the method described in the third embodiment above, which will not be repeated here.

Moreover, if the system of the fourth embodiment is implemented in the form of software functional units and sold or used as an independent product, it can be stored in a computer-readable storage medium.

In particular, the computer-readable storage medium may include: any entity or device capable of carrying the computer program code, a recording medium, a USB flash drive, a removable hard disk, a magnetic disk, an optical disk, a computer memory, a read-only memory (ROM, Read-Only Memory), random access memory (RAM, Random Access Memory), electric carrier signal, telecommunication signal and software distribution medium, etc.

Various embodiments of the present invention have been described above, and the foregoing descriptions are exemplary, not exhaustive, and not limiting of the disclosed embodiments. Numerous modifications and variations will be apparent to those skilled in the art without departing from the scope and spirit of the described embodiments. The terminology used herein was chosen to best explain the principles of the various embodiments, the practical application or technical improvement in the marketplace, or to enable others of ordinary skill in the art to understand the various embodiments disclosed herein.

What is claimed is:

1. A method for securely connecting a vehicle and a Bluetooth key, comprises:

receiving, by the vehicle Bluetooth module, an authentication request from the Bluetooth key, wherein the authentication manner of the authentication request is a simple authentication or an common authentication when a vehicle Bluetooth module successfully establishes a Bluetooth communication connection with a mobile terminal installed with a Bluetooth key;

performing, by the vehicle Bluetooth module, security authentication on the Bluetooth key according to the simple authentication manner, and sending the authentication result to the Bluetooth key when the authentication manner of the authentication request is the simple authentication;

securely connecting, by the vehicle Bluetooth module, with the Bluetooth key when the authentication result is authentication passed;

performing, by the vehicle Bluetooth module, security authentication with the Bluetooth key according to the common authentication manner when the authentication result indicates that authentication fails, or the authentication manner of the authentication request is common authentication;

wherein performing, by the vehicle Bluetooth module, security authentication on the Bluetooth key according to the simple authentication manner, comprises:

determining, by the vehicle Bluetooth module, whether there is a key whitelist;

obtaining, by the vehicle Bluetooth module, the device information of the currently connected mobile terminal if there is a key whitelist, and determining whether there is a digital key matching the device information in the key whitelist;

verifying, by the vehicle Bluetooth module, the digital key according to a preset verification rule if there is a digital key matching the device information in the key whitelist, and determining whether the security authentication is passed according to the verification result;

wherein performing, by the vehicle Bluetooth module, security authentication with the Bluetooth key according to the common authentication manner, further comprises:

generating, by the vehicle Bluetooth module, a key whitelist, and storing the digital key in the key whitelist when the vehicle Bluetooth module and the Bluetooth key are successfully authenticated according to the common authentication manner, and if there is no key whitelist;

or, storing, by the vehicle Bluetooth module, the digital key in the key whitelist if there is a key whitelist and there is no digital key matching the device information in the key whitelist;

or, replacing, by the vehicle Bluetooth module, the digital key matching the device information in the key whitelist with the generated digital key if there is a key whitelist and there is a digital key matching the device information in the key whitelist.

2. The method for securely connecting a vehicle with a Bluetooth key according to claim 1, wherein performing, by the vehicle Bluetooth module, security authentication with the Bluetooth key according to the common authentication manner, comprises:

sending, by the vehicle Bluetooth module, a first feature value and a first random number to the Bluetooth key, and receiving a second feature value, a second random number, and key authority data configured to generate the digital key sent by the Bluetooth key;

receiving, by the vehicle Bluetooth module, a first encrypted feature value sent by the Bluetooth key, and performing key authentication on the Bluetooth key according to the first feature value, the key authority data, and the first encrypted feature value; wherein, the first encrypted feature value is obtained by encrypting the first feature value by the Bluetooth key according to the digital key downloaded from the server; the second feature value and the digital key downloaded by the Bluetooth key from the server are configured for the Bluetooth key to perform key authentication on the vehicle Bluetooth module;

generating, by the vehicle Bluetooth module, a session key according to the first random number and the second random number after the key authentication is passed;

wherein, when both the vehicle Bluetooth module and the Bluetooth key pass the key authentication of each other and the session key is successfully generated, the vehicle Bluetooth module and the Bluetooth key are securely connected.

3. The method for securely connecting a vehicle with a Bluetooth key according to claim 2, wherein receiving, by the vehicle Bluetooth module, a first encrypted feature value sent by the Bluetooth key, and performing key authentication on the Bluetooth key according to the first feature value, the key authority data, and the first encrypted feature value, comprises:

generating, by the vehicle Bluetooth module, a digital key according to the key authority data, and receiving the first encrypted feature value sent by the Bluetooth key;

decrypting, by the vehicle Bluetooth module, the first encrypted feature value according to the generated digital key to obtain a first verification feature value, and determining whether the key authentication is passed according to the matching result between the first verification feature value and the first feature value;

encrypting, by the vehicle Bluetooth module, the second feature value according to the generated digital key to obtain a second encrypted feature value, and sending the second encrypted feature value to the Bluetooth key; wherein the second encrypted feature value, the second feature value and the digital key downloaded from the server by the Bluetooth key are configured for the Bluetooth key to perform key authentication on the vehicle Bluetooth module.

4. A method for securely connecting a vehicle and a Bluetooth key, wherein comprises:

obtaining, by the Bluetooth key, the security information of the mobile terminal, and determining the authentication manner of the security authentication according to the security information; when a mobile terminal installed with a Bluetooth key and a vehicle Bluetooth module successfully establish a Bluetooth connection wherein the authentication manner is simple authentication or common authentication;

generating, by the Bluetooth key, an authentication request according to the determined authentication manner, and sending the authentication request to the vehicle Bluetooth module;

receiving, by the Bluetooth key, the authentication result returned by the vehicle Bluetooth module when the authentication manner of the authentication request is simple authentication; the authentication request is configured for the vehicle Bluetooth module to perform security authentication on the Bluetooth key according to the simple method;

securely connecting, by the Bluetooth key, with the vehicle Bluetooth module when the authentication result is authentication passed;

performing, by the Bluetooth key, security authentication with the vehicle Bluetooth module according to the common authentication manner when the authentication result indicates that authentication fails, or the authentication manner of the authentication request is common authentication;

wherein the security information includes device change information of the mobile terminal, user change information, digital key change information and time information when the user logs in the Bluetooth key;

determining, by the Bluetooth key, that the authentication manner of the security authentication is the simple authentication when the device change information of the mobile terminal, user change information, digital key change information and the time information when the user logs in the Bluetooth key meet the preset security conditions;

determining, by the Bluetooth key, that the authentication manner of security authentication is the ordinary authentication when the device change information of the mobile terminal, user change information, digital key change information and the time information when the user logs in the Bluetooth key do not meet the preset security conditions.

5. The method for securely connecting a vehicle with a Bluetooth key according to claim 4, wherein when the authentication manner of the authentication request is the simple authentication, the authentication request is in particular configured for the vehicle Bluetooth module to obtain the digital key that matches the device information from the key whitelist according to the device information, and verify the digital key for simple authentication of the Bluetooth key.

6. The method for securely connecting a vehicle with a Bluetooth key according to claim 4, wherein Performing, by the Bluetooth key, security authentication with the vehicle Bluetooth module according to the common authentication manner, comprises:

sending, by the vehicle Bluetooth key, a key download request to the server, and receives the digital key returned by the server;

sending, by the Bluetooth key, a second characteristic value, a second random number, and key authority data for generating the digital key to the vehicle Bluetooth module, and receives a first characteristic value and a first random number sent by the vehicle Bluetooth module;

encrypting, by the Bluetooth key, the first feature value according to the downloaded digital key to obtain the first encrypted feature value, and sends the first encrypted feature value to the vehicle Bluetooth module;

receiving, by the Bluetooth key, the second encrypted feature value sent by the vehicle Bluetooth module, and decrypts the second feature value according to the digital key to obtain the second verification feature value;

determining, by the Bluetooth key, whether the key authentication of the vehicle Bluetooth module is passed according to the matching result between the second verification feature value and the second feature value;

generating, by the Bluetooth key, a session key according to the first random number and the second random number;

wherein, the first feature value, the key authority data, and the first encryption feature value are configured for the vehicle Bluetooth module to perform key authentication on the Bluetooth key according to the common authentication manner; the second encryption feature value is configured for the vehicle Bluetooth module to generates a digital key according to the key authority data, and encrypts the second feature value according to the generated digital key; when the Bluetooth key and the vehicle Bluetooth module pass the key authentication of each other according to the common authentication manner and the session key is successfully generated, the Bluetooth key is securely connected with the vehicle Bluetooth module.

7. A non-transient computer-readable storage medium having stored therein instructions that, when executed by a processor of a device, causes the device to perform a method for generating driving suggestions, the method comprises:

receiving, by the vehicle Bluetooth module, an authentication request from the Bluetooth key, wherein the authentication manner of the authentication request is a simple authentication or an common authentication when a vehicle Bluetooth module successfully establishes a Bluetooth communication connection with a mobile terminal installed with a Bluetooth key;

performing, by the vehicle Bluetooth module, security authentication on the Bluetooth key according to the simple authentication manner, and sending the authentication result to the Bluetooth key when the authentication manner of the authentication request is the simple authentication;

securely connecting, by the vehicle Bluetooth module, with the Bluetooth key when the authentication result is authentication passed;

performing, by the vehicle Bluetooth module, security authentication with the Bluetooth key according to the common authentication manner when the authentication result indicates that authentication fails, or the authentication manner of the authentication request is common authentication;

wherein the vehicle Bluetooth module performs security authentication on the Bluetooth key according to the simple authentication manner, comprises:

determining, by the vehicle Bluetooth module, whether there is a key whitelist;

obtaining, by the vehicle Bluetooth module, the device information of the currently connected mobile terminal if there is a key whitelist, and determining whether there is a digital key matching the device information in the key whitelist;

verifying, by the vehicle Bluetooth module, the digital key according to a preset verification rule if there is a digital key matching the device information in the key whitelist, and determining whether the security authentication is passed according to the verification result;

wherein the vehicle Bluetooth module performs security authentication with the Bluetooth key according to the common authentication manner, further comprises:

generating, by the vehicle Bluetooth module, a key whitelist, and storing the digital key in the key whitelist when the vehicle Bluetooth module and the Bluetooth key are successfully authenticated according to the common authentication manner, and if there is no key whitelist;

or, storing, by the vehicle Bluetooth module, the digital key in the key whitelist if there is a key whitelist and there is no digital key matching the device information in the key whitelist;

or, replacing, by the vehicle Bluetooth module, the digital key matching the device information in the key whitelist with the generated digital key if there is a key whitelist and there is a digital key matching the device information in the key whitelist.

8. The non-transient computer-readable storage medium according to claim 2, wherein the vehicle Bluetooth module performs security authentication with the Bluetooth key according to the common authentication manner, comprises:

sending, by the vehicle Bluetooth module, a first feature value and a first random number to the Bluetooth key, and receiving a second feature value, a second random number, and key authority data configured to generate the digital key sent by the Bluetooth key;

receiving, by the vehicle Bluetooth module, a first encrypted feature value sent by the Bluetooth key, and performing key authentication on the Bluetooth key according to the first feature value, the key authority data, and the first encrypted feature value; wherein, the first encrypted feature value is obtained by encrypting the first feature value by the Bluetooth key according to the digital key downloaded from the server; the second feature value and the digital key downloaded by the Bluetooth key from the server are configured for the Bluetooth key to perform key authentication on the vehicle Bluetooth module;

generating, by the vehicle Bluetooth module, a session key according to the first random number and the second random number after the key authentication is passed;

wherein, when both the vehicle Bluetooth module and the Bluetooth key pass the key authentication of each other and the session key is successfully generated, the vehicle Bluetooth module and the Bluetooth key are securely connected.

9. The non-transient computer-readable storage medium according to claim 8, wherein the vehicle Bluetooth module receives a first encrypted feature value sent by the Bluetooth key, and performs key authentication on the Bluetooth key according to the first feature value, the key authority data, and the first encrypted feature value, comprises:

generating, by the vehicle Bluetooth module, a digital key according to the key authority data, and receiving the first encrypted feature value sent by the Bluetooth key;

decrypting, by the vehicle Bluetooth module, the first encrypted feature value according to the generated digital key to obtain a first verification feature value, and determining whether the key authentication is passed according to the matching result between the first verification feature value and the first feature value;

encrypting, by the vehicle Bluetooth module, the second feature value according to the generated digital key to obtain a second encrypted feature value, and sending the second encrypted feature value to the Bluetooth key; wherein the second encrypted feature value, the second feature value and the digital key downloaded from the server by the Bluetooth key are configured for the Bluetooth key to perform key authentication on the vehicle Bluetooth module.

\* \* \* \* \*